Feb. 11, 1958 C. F. LARSSON ET AL 2,823,320
POWER PRODUCING UNIT
Filed Nov. 16, 1954 2 Sheets-Sheet 1
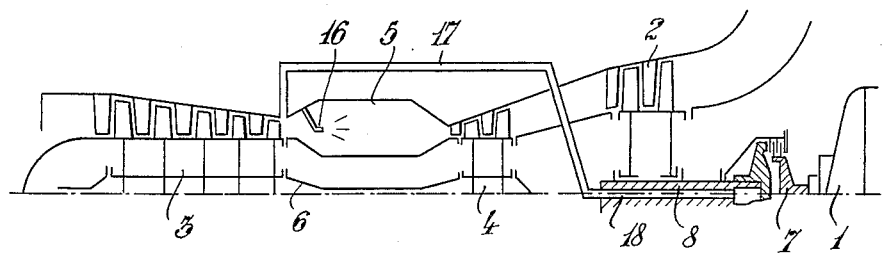
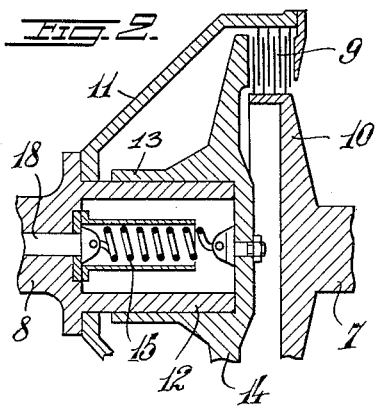
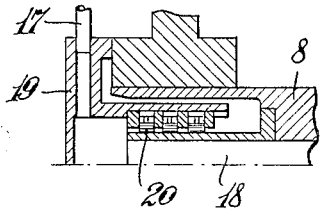
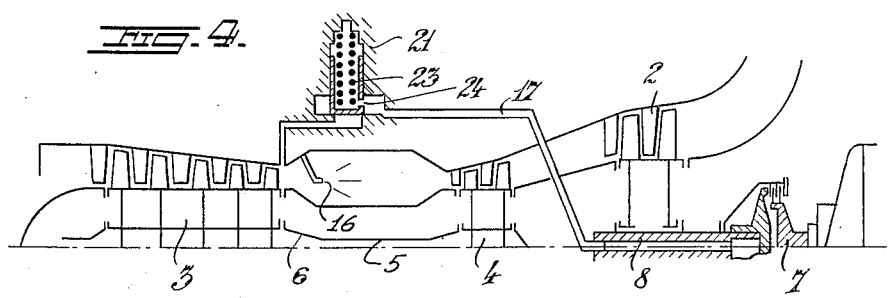
Inventors
Carl F. Larsson,
Gustav A. Themer,
Frans E. O. Ostmar,
by Sommers & Young
Attorneys

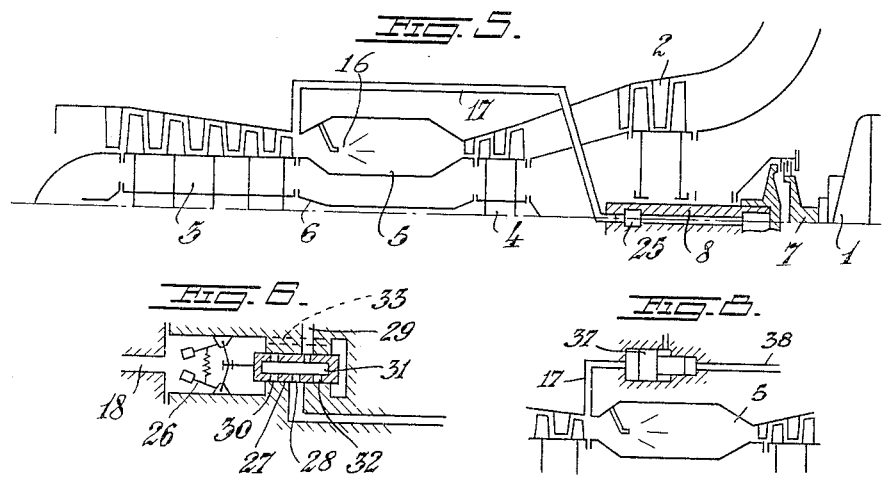
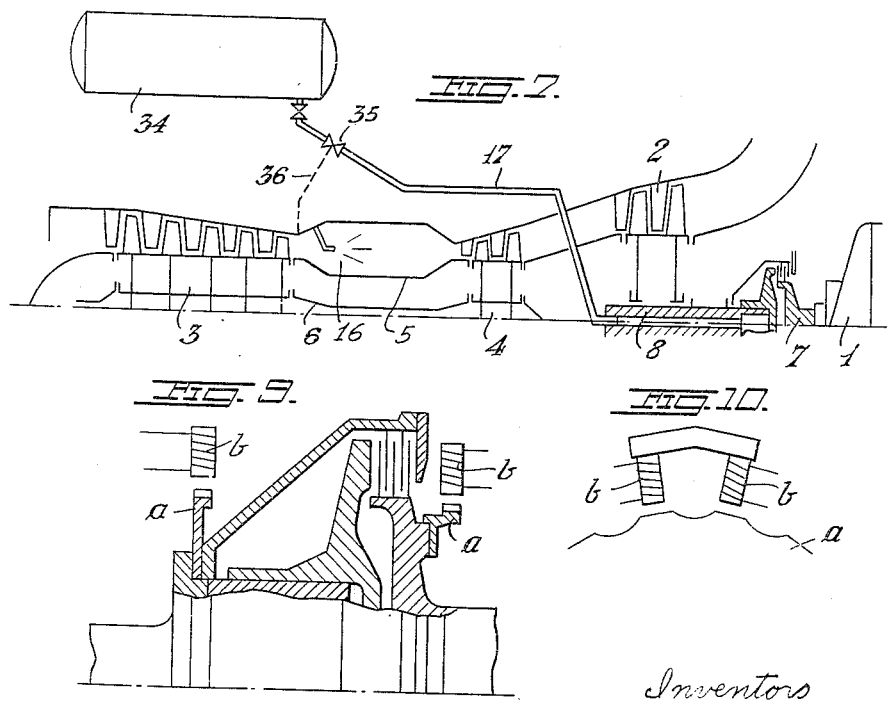

United States Patent Office 2,823,320
Patented Feb. 11, 1958

2,823,320

POWER PRODUCING UNIT

Carl Folke Larsson, Finspong, Gustav Axel Themer, Trollhattan, and Frans Eric Ossian Östmar, Finspong, Sweden Application November 16, 1954, Serial No. 469,258

Claims priority, application Sweden November 23, 1953

1 Claim. (Cl. 290—4)

The present invention relates to a power producing unit comprising an electric generator connected to a network and a gas turbine connected to the generator by means of a disengaging coupling of the lamination type or the cone type which is supplied with driving medium from a gas producer comprising a compressor, a combustion chamber and a turbine for driving the compressor.

The invention is characterized, chiefly, by the fact that one half of the coupling, viz. either the one connected to the shaft of the gas turbine or the one connected to the shaft of the generator, is provided with an air and spring-controlled cylinder which, when driven by air supplied through a conduit leading from the compressor of the gas producer, after the latter has reached a predetermined number of revolutions, or from a compressed air container, forces said cylinder against the adjacent half of the coupling, thereby throwing the coupling into action so as to couple the turbine with the generator for supplying power to the network, the turbine and the generator being disconnectable for the purpose of phase compensation by allowing the air contained in the cylinder to escape so that a spring attached to said cylinder may pull the cylinder out of engagement with the respective half of the coupling.

The invention is illustrated in the accompanying drawings in which Figs. 1–8 are axial sections of diagrammatically shown power units embodying the invention or parts of such units. Figs. 9 and 10 are side elevation and front view, respectively, of a synchronization device.

The numeral 1, Fig. 1, indicates a generator connected to a network which is driven by a gas turbine 2 for delivering electric energy. The gaseous driving medium for said turbine is supplied from a rotary gas producer comprising a compressor 3, a gas turbine 4 for driving said compressor and a combustion chamber 5 situated between said compressor and said gas turbine. The compressor and the turbine of the gas producer are supported by a common shaft 6, the generator is supported by a shaft 7 and the turbine 2 by a shaft 8.

In power plants of the kind above outlined it may be desirable to use the generator not only for delivering energy to the network but also for effecting a phase compensation of the network. In synchronous running there will be too large losses if the turbine is allowed to be driven by the generator and, likewise, the gas producer must be stopped in order not to consume fuel unnecessarily. Thus, according to the invention there is inserted a coupling between the generator 1 and the turbine 2, said coupling being so arranged as to automatically disengage the shafts 7 and 8 each other for the purpose of synchronous running under the control of impulses resulting from the stopping of the gas producer.

The coupling inserted between the shafts 7 and 8 is shown on a larger scale in Fig. 2. As an example, said figure shows a lamination coupling comprising laminae 9 alternately attached to a flange 10 of the generator shaft 7 and to a casing 11 supported by the turbine shaft 8, respectively. In said casing 11 there is a cylinder-shaped piston 12 concentric with the shaft 8 and a cylinder 13 having a flange 14 which on axial displacement brings the laminae 9 into or out of engagement with each other. The cylinder 13 is slidably mounted on the piston 12 which is hollow and contains a spring 15 adapted to retract the cylinder 13 towards the piston 12.

In operation, the gas producer drives itself by means of fuel supplied through a spraying nozzle 16, Fig. 1. By increasing the admission of fuel the speed may be increased and thus also the air pressure behind the compressor 3. Through an air conduit 17 and a passage 18 in shaft 8, see also Fig. 2, the pressure side of the compressor is in communication with the boring of the piston 12, the pressure thus produced in said boring causing the cylinder 13 to compress the set of laminae 9, thereby coupling the shafts 7 and 8 together. Because of the starting of the gas producer gas may also be supplied to the driving turbine 2 so that the generator will increase its speed when coupled to the turbine and may be brought into phase with the network.

When synchronous running is desired for the purpose of phase compensation, the admission of fuel through the spraying nozzle 16 is interrupted. The gas producer is stopped and when a certain reduced pressure inside the cylinder 12 is reached, the spring 15 pulls the cylinder 13 back against the piston 12. By this action the generator will be disengaged from the turbine 2 and may slip with the network without such losses as would be caused by a turbine rotating with the generator.

The device above described for throwing in the coupling has reference to machines for small amounts of power while in case of larger machines too great amounts of friction heat would be produced in the coupling unless a synchronization of the two halves of the coupling were used. Such a synchronization should principally be so arranged that a difference in frequency between the two halves of the coupling may be determined and allow the coupling to be thrown in only when the said difference sinks below a given value. Thus, for instance, a manual throwing in of the coupling may be effected by means of a stroboscope. In Fig. 9 is shown by way of example a synchronization device for effecting an automatic throwing in of the coupling.

Provided on each half of the coupling is a toothed wheel $a$ and opposite each toothed wheel there is a permanent magnet including a winding $b$ in which an alternating voltage is induced upon rotation of the toothed wheel. The frequency thus obtained will be proportional to the number of revolutions and when both are compared beats will be obtained the frequency of which decreases as the difference between the frequencies of both coils sinks.

Fig. 3 shows how the conduit 17 may be connected to the rotary shaft 8. Inserted between the shaft 8 and a stationary member 19 is a packing 20 of well-known character, as for instance, comprising piston ring segments clamped together by means of annular helical springs.

In order to avoid long and wearing periods when the coupling is thrown into and out of gear the unit shown in Fig. 4 is provided with a valve 21 inserted in the conduit 17 which comprises an open topped valve sleeve 22 which is axially slidable in a casing. A compression spring 23 acts to keep the valve closed until a pre-determined pressure is reached, which opens the valve and allows air to freely pass to the cylinder. When the air pressure is reduced to a predetermined value the valve is closed by its spring and interrupts the air admission. At the same time a port 24 in the valve sleeve brings the air space in the piston 12 in communication with the atmosphere, so that the air may escape by this way and allow disengaging of the coupling.

Fig. 6 is a detail view of the member designed as a whole by 25 in Fig. 5. Said detail consists of a device for allowing and interrupting the flow of compressed air by means of a centrifugal governer 26 provided in a space in shaft 8. Said governor displaces on a variation of its speed an apertured valve 27 which in the position shown prevents the supply of air from passage 18 to the boring of piston 12, Fig. 2, and instead thereof brings said boring into communication with the atmosphere through the apertures 28 and 29. The generator is by that time disengaged. On starting, the turbine shaft 8 is speeded up. The centrifugal governor 26 attracts slide 27 to allow compressed air to enter the clutch through the apertures 30, 31 and 32. The dotted passage 33 connects the two spaces on opposite sides of the slide with each other so that the pressure will be equal on both sides of the slide. When the gas producer stops, the pressure inside the coupling decreases with the result that the clutch slips and the turbine 8 starts slackening. When a predetermined number of revolutions is reached, the slide 27 is displaced to the position shown in Fig. 6 and the pressure inside the coupling is rapidly reduced due to the air having a free passage to the atmosphere.

In the embodiment shown in Fig. 7 the controlling air is delivered from a compressed air container 34. A valve 35 in the conduit 17 is so arranged as to be operated by the pressure behind the compressor via an impulse conduit 36 and on starting opens at a given pressure. At a given lower pressure the valve 35 interrupts the air admission while at the same time providing a discharge passage to the atmosphere for the air contained in the coupling.

Fig. 8 shows how the air pressure in the conduit 17 by means of a piston 37 is converted into a hydraulic pressure in a conduit 39 which, for instance, passes oil to the coupling.

We claim:

A power-producing unit comprising in combination, an electric generator, a gas turbine for mechanically driving said generator, a gas producing unit for delivering driving gas to said gas turbine, said unit including a compressor, a combustion chamber and another gas turbine in series arrangement, a common shaft supporting said compressor and said other gas turbine for transferring driving power from said other turbine to said compressor, a duct for passing gas from said unit to the first-mentioned gas turbine, a friction clutch for connecting said generator to the first-mentioned gas turbine, a spring device for throwing said clutch out of gear, a compressed air receptacle, a conduit for passing compressed air from said receptacle to said clutch for throwing same into gear against the action of said spring device, a valve mechanism in said conduit controlling the flow of compressed air therethrough, and an impulse conduit leading from behind the compressor of the gas producing unit to said valve mechanism for opening the valve upon the attainment of a predetermined air pressure as generated by said compressor.

References Cited in the file of this patent
UNITED STATES PATENTS

| | | |
|---|---|---|
| 2,039,426 | Kerr | May 5, 1936 |
| 2,193,114 | Seippel | Mar. 12, 1940 |
| 2,482,791 | Nettel et al. | Sept. 27, 1949 |